United States Patent [19]
Fraser

[11] Patent Number: 5,934,198
[45] Date of Patent: Aug. 10, 1999

[54] MONORAIL TRANSPORTATION SYSTEM

[76] Inventor: Michael Fraser, 3422 Oakview Pl., Cincinnati, Ohio 45209

[21] Appl. No.: 09/030,265

[22] Filed: Feb. 25, 1998

[51] Int. Cl.[6] .................................................. B61F 5/00
[52] U.S. Cl. ......................... 105/144; 104/119; 104/124
[58] Field of Search .............................. 104/89, 93, 106, 104/118, 119, 124, 125; 105/141, 144, 148, 149, 149.1, 150

[56] References Cited

U.S. PATENT DOCUMENTS

| | | |
|---|---|---|
| 1,431,536 | 10/1922 | Maloney . |
| 3,122,105 | 2/1964 | Scherer . |
| 3,890,904 | 6/1975 | Edwards ................................. 105/141 |
| 4,000,702 | 1/1977 | Mackintosh ............................. 104/89 |
| 4,042,308 | 8/1977 | Freedman . |
| 4,050,385 | 9/1977 | Gurr et al. . |
| 4,274,335 | 6/1981 | Boland . |
| 4,274,336 | 6/1981 | Pater et al. . |
| 4,503,778 | 3/1985 | Wilson . |
| 4,671,186 | 6/1987 | Kunczynski . |
| 4,690,064 | 9/1987 | Owen . |
| 4,905,605 | 3/1990 | Shishido et al. . |
| 4,996,928 | 3/1991 | Janssen et al. .......................... 105/144 |
| 5,303,656 | 4/1994 | Makimura et al. . |
| 5,372,072 | 12/1994 | Hamy . |
| 5,381,737 | 1/1995 | Trenary . |
| 5,456,182 | 10/1995 | Neeman . |
| 5,456,183 | 10/1995 | Geldbaugh . |
| 5,492,066 | 2/1996 | Nozaki et al. . |

OTHER PUBLICATIONS

*Seattle Monorail Photos,* Information from Internet (no date).
*Tokyo Airport Monorail,* Monorails; pp. 90–91; Pre 1992.
*Case Studies* (*Advanced Technology*), Airtrans in Dallas–Ft. Worth Airport; pp. 119–123; Apr. 1978.
Morgantown Monorails; pp. 116–119; Apr. 1978.
Article from Internet on various Monorail Systems (no date).
Joan Blatterman, The Future: A new urban transit system stands a chance of getting people out of their cars, Architectural Record, Jul. 1997.
Seattle; Washington; Tokyo; Japan; Dallas Ft. Worth International Airport; and Charleston, West Virginia transportation systems discussed on p. 6 of this application. (no date).

*Primary Examiner*—Mark T. Le
*Attorney, Agent, or Firm*—Wood, Herron & Evans, L.L.P.

[57] ABSTRACT

A personal rapid transit vehicle for movement on a monorail guideway system advantageously limits the vehicle width by requiring the riders to be seated in the vehicle. Furthermore, a suspension system for coupling the vehicle to the guideway provides for a very light, narrow driverless vehicle in which the riders face sideways and are suspended laterally from and seated over the guideway. The suspension system controls lift, slip and roll of the vehicle relative to the guideway and allows a reduction in the guideway cross-sectional area. Moreover, the guideway, rather than the vehicle itself, absorbs all overturning or roll vibration.

25 Claims, 6 Drawing Sheets

MONORAIL TRANSPORTATION SYSTEM

BACKGROUND OF THE INVENTION

This invention relates to a monorail transportation system, and more particularly, to a suspension system for a vehicle operating on a monorail.

During their short history, automated people movers and personal rapid transit systems, including unscheduled, driverless, small vehicle public transit, have been characterized by standing-height vehicles wide enough to require upper wheels for suspension from a monorail or on both sides of the center of gravity of the vehicle so that the vehicle rides on four or more wheels on a track or the like. Known monorail transportation systems have required tall, wide or heavy monorails in cross section to distribute the vehicle weight over a wide footprint around the vehicle's center of gravity. For instance, U.S. Pat. No. 5,456,183 issued to Geldbauh discloses a horizontal supporting guideway which is at least half the width of the vehicle. This system depends upon a flanged hanging wheel to absorb overturning force, which will result in unpredictable lateral forces and uneven wear on all three of the guide wheels in that invention.

In another prior art system, U.S. Pat. No. 4,690,064 issued to Owen is illustrative of systems which support the vehicle by hanging it from approximately midway up the side of the vehicle. This not only results in the cross section of the monorail being visually obstructive and thereby negating the original motivation for a monorail system by limiting the routes it may follow with minimal environmental and structural impact, but it also requires that the guideway or monorail, rather than the vehicle, absorb all of the overturning vibration. For any useful long span, a guideway or monorail 3' wide or 4' high is required in such a system to resist torsion from the span itself as well as rolling torsion from the vehicle. In the Owen invention, the integral pendulum support magnifies the mid-span overturning and vibration, which will be transmitted through the long overhead arm to the occupants of the vehicle.

Monorail systems typically must control the following three forces effectively: roll (around the longitudinal axis of the guideway), slip (lateral movement on the guideway) and gravity/lift (vertical movement relative to the guideway). A fourth force, the pitch (around the lateral axis) results from differences in reaction to gravity at the front and rear of the vehicle and can be controlled by resisting gravity/lift at two points, typically fore and aft. A fifth force, yaw, is a slip reaction differing fore and aft and can be treated with two slip resisting suspensions. Suspension of a moving, occupied vehicle from a guideway of more than one point and along the vehicle's length requires minimizing roll, slip and drop/gravity/lift at each point where the vehicle is held away from the running surfaces.

Simply rolling the suspension of the vehicle along the guideway's top surface, as in an automobile, merely controls the gravity/lift. Two additional problems remain in a monorail system; namely, the wheels will wear down very quickly by wobbling side to side in a slip direction against the running surface, and the occupants of the vehicle will rock from side to side (roll) if right and left guideway surfaces induce any differing reactions to the vehicle's weight. Typically, these problems are solved by trapping the vehicle laterally with some form of horizontally mounted supplementary guide wheels and by damping the roll on board the vehicle. Automobiles control these problems with two spring/damper suspension points at each axle and highly energy absorbing air filled rubber tires.

However, prior art monorail systems and the associated suspension systems thereof do not adequately solve the problems of roll and slip beyond those required of traditional automobile or train (dual tracks) suspension systems. When a monorail vehicle is mounted above the guideway, its weight and that of its occupants is cantilevered vertically from its suspension, with logarithmically increasing overturning forces progressively higher along the vehicle's cross section. The moment forces which remain after the vehicle's undercarriage is sprung and dampered are significantly compounded, particularly above the guideway surface where the occupants experience roll and slip. Theoretically, slip is constant at all vertical locations above the guideway; however, it translates into roll when the suspension is engaged or adhered to the guideway or track. Industrial or unoccupied monorail vehicles are concerned only with wear on the wheels and not the comfort of the items being transported. Automobiles are required to transmit forces to the driver for proper handling. Only people movers must eliminate, if at all possible, all the roll and slip originating at the track or guideway surface.

Monorails previously constructed in Europe, and many cable suspended tramways, solve the roll and slip problems by mounting the vehicle below the guideway. Prior art monorail systems of this type which have an overhead suspension have only had to damper the roll forces and let gravity center the suspended vehicle with minimal swaying. Unfortunately, minimal twisting in the overhead track, if the pendulum forces in the vehicle match the period of the twisting guideway, will generate an uncomfortable periodic swaying. This is typical where a guideway is supported with regularly spaced support columns.

Additionally, roll and slip are resisted at the top of each column in overhead suspension monorail systems. An overhead suspension requires significant additional column cross section to resist the cantilever force of the added column height so that the guideway structure becomes unmanageably heavy if riders are to be transported in comfort.

Some forces will be transmitted from the guideway to the vehicle and these forces must be sprung and damped before they are multiplied at the passenger compartment. Prior art systems have often shown a long arm or frame extending around part of the vehicle at each longitudinal suspension point. These designs not only add to the vehicle mass and cantilever forces, but also extend the point of greatest vibration far above the guideway thereby requiring extra damping to merely overcome the pendulum effect of the vehicle's hanging arm.

Many prior art monorail transportation systems provide some additional roll resistance by extending the guideway or rail upwardly along the side of the vehicle or in the center of the vehicle. When the vehicle rests on three or four vertically mounted running wheels, a side rail or rails, with rolling surfaces for additional horizontally mounted guide wheels, has been used to resist slip and allow the wheel base or chassis of the vehicle to resist roll. In these systems, the guideway is typically one-third the width of the vehicle. When the vehicle moves on fewer than three undercarriage wheels and uses the guideway to resist roll, the guideway must extend at least halfway up the side of the vehicle and be nearly perfectly stiff. Even if the vehicle straddles the monorail as in existing heavy monorails in operation in Seattle, Wash. and Tokyo, Japan, the undercarriage height is about one-half the height of the occupied vehicle and/or the rail extends into the center of the passenger compartment. In these systems, the rail once again must be heavy, stiff and large, and, as a result, these types of systems have had as severe a detrimental impact on urban design as that of undercarriage suspended vehicles like those at the Dallas, Ft. Worth International Airport and in Morgantown, W.Va.

Therefore, there is a need for an improved monorail transportation system and associated vehicle suspension system for a monorail which controls the roll, slip and lift/gravity forces of the vehicle without the above described disadvantages.

SUMMARY OF THE INVENTION

These and other objectives of the invention are attained by a monorail transportation system and associated vehicle suspension system which permits a reduction in the guideway cross-sectional profile.

Specifically, in a present embodiment this invention includes a monorail transportation system having a fixed guideway with an upper running surface and a pair of opposed guideway side surfaces and a passenger vehicle mounted for movement along the guideway and propelled by a linear drive motor. The corresponding armature for the linear drive motor is advantageously located along the guideway. The vehicle includes a suspension system that couples the vehicle to the guideway, and controls lift, slip and roll of the vehicle relative to the guideway. Identical mirror image suspension linkages are provided fore and aft of each vehicle including the specified linkages and running wheels mounted for rotation on the guideway upper running surface and guide wheels contacting the lower guideway surfaces of the monorail.

The present invention provides for a small guideway which can be stiffened for any span length from a side opposite the vehicle. Each of the vertical, horizontal and rotational components of the vehicle suspension is sprung and dampered separately to handle varying roll centers and control build-up periodic frequencies. Advantageously, the center of gravity of the vehicle is always outside and often directly above the guideway which allows for a heavier, smaller and more torque resistant guideway beam structure. Specifically, the guideway beam structure in a present embodiment has a T-shaped cross-sectional profile with an upper running surface and two protected guide surfaces below the running surface to simplify outdoor operation of the system. Additionally, because the vehicle is light and includes three guide wheel positions as idler wheels, a linear motor is mounted securely into both the guideway and the close hung vehicle with minimal variation and gap between the motor stator and complimentary armature.

A monorail guideway according to a present embodiment of this invention includes a top running surface and two integral, outwardly facing guide wheel surfaces below to allow a very small personal transit vehicle to be mounted around its top and one side surface and propelled by linear motors and controlled by track mounted electronic guidance as opposed to an onboard vehicle driver. Each such vehicle is mounted by a spring from a single running wheel aft and the axle of the wheel of the vehicle immediately forward in a train of vehicles. The lead vehicle in each train has two running wheels and offers adequate additional interior floor surface to meet the wheelchair access requirements of the Americans With Disabilities Act (ADA), as well as extra guidance equipment.

Importantly, lateral displacement (slip) and roll around each vehicle's longitudinal axis are controlled by sprung and dampered linkages which are connected via two bogies fore and aft to guide wheels rolling along the guideway surfaces of the guideway. The bogies and associated dampered linkages and guide wheels each roll in torsion along the two guideway surfaces and hang from the upper guide wheel and bear against the lower guide wheel whenever the total vehicle center of gravity is not positioned directly above the axis of the fore and aft running wheels. The two bogies are mounted on a single undercarriage assembly which links them at their two axes of rotation and which lies along a chord of any curve in the guideway.

The present invention minimizes guideway cross-sectional profile to, at most, one-third the vehicle height or width. When the guideway rail is this small, twisting or laterally flexing forces in the rail will be multiplied into severe slip and roll at the passenger compartment. These forces can be controlled effectively at two sources; namely, the rail and the vehicle's suspension system. Because the rail or guideway in the present invention is so small in height and because it can be reinforced along its inner face, a minimum amount of cantilever forces occur at the top face of the rail. The rail or guideway is inherently stocky and stiff because its top deflects less laterally with the change in loading as a vehicle passes along and twists the guideway. The induced forces in a short guideway are less and whatever reinforcement is required in the guideway is smaller and more rugged because it does not need to extend to the top of a thin, tall rail. Advantageously, materials other than the traditional poured concrete or massive truss structure, such as extruded polypropylene, can be used for the rail of this invention.

The present invention provides a suspension system for a very light, narrow, driverless vehicle in which most riders face sideways and the vehicle is suspended laterally from the guideway with the rider seated approximately over the guideway. By limiting vehicle width and requiring riders to be seated, the vehicle permits urban transportation on a monorail guideway with a very small cross section and much lower construction costs, all of which provide for a comfortable, fast loading vehicle. Furthermore, access to destinations which are only accessible via a very low or narrow right-of-way and the potential to assemble individual vehicles into trains without sacrificing boarding time, privacy or efficiency of shared destinations are all obtainable with the present invention.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
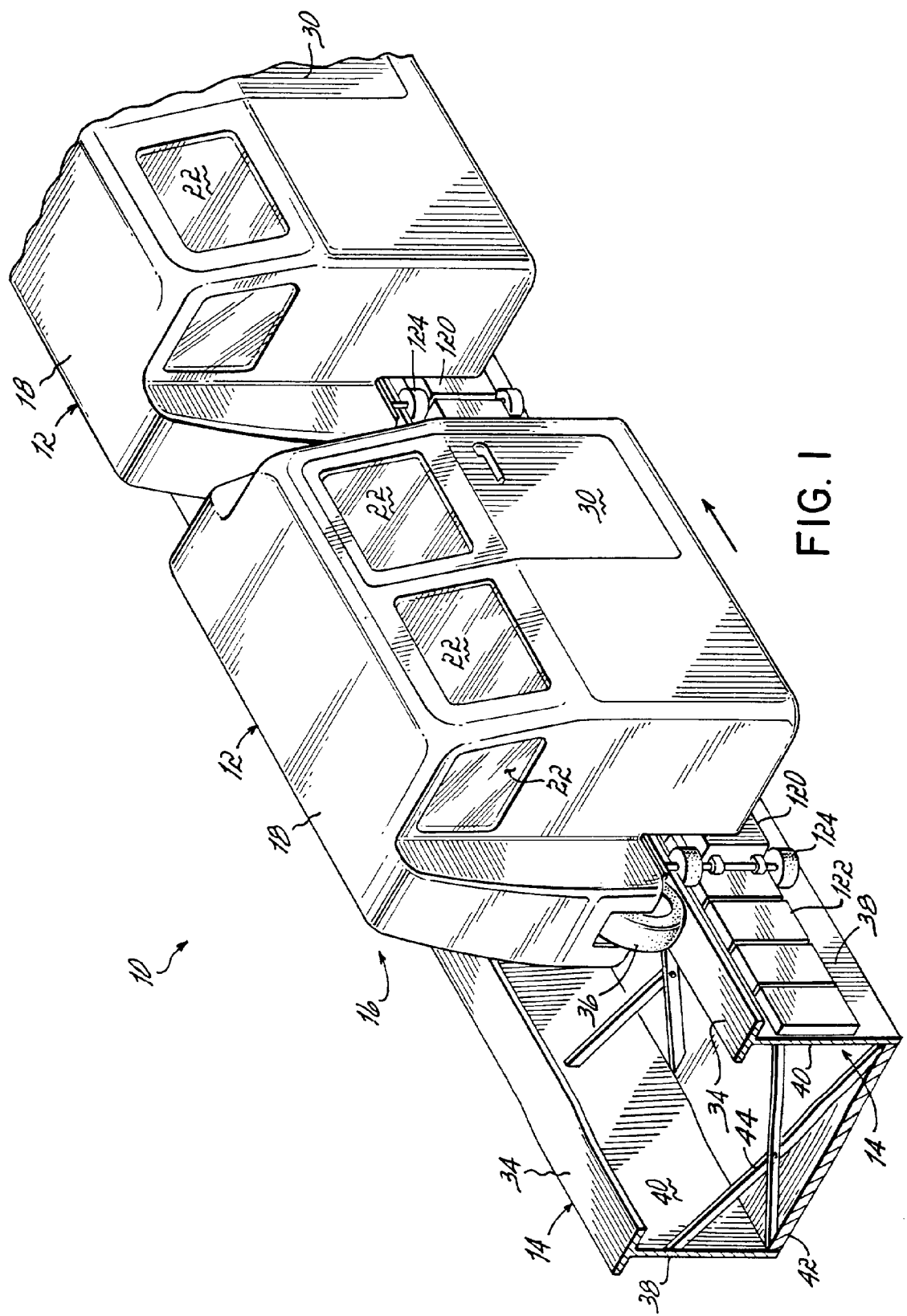
FIG. 1 is a partial perspective view of an end vehicle mounted for movement on a guideway and coupled to additional vehicles forming a train according to a present embodiment of this invention.
Figure 2:
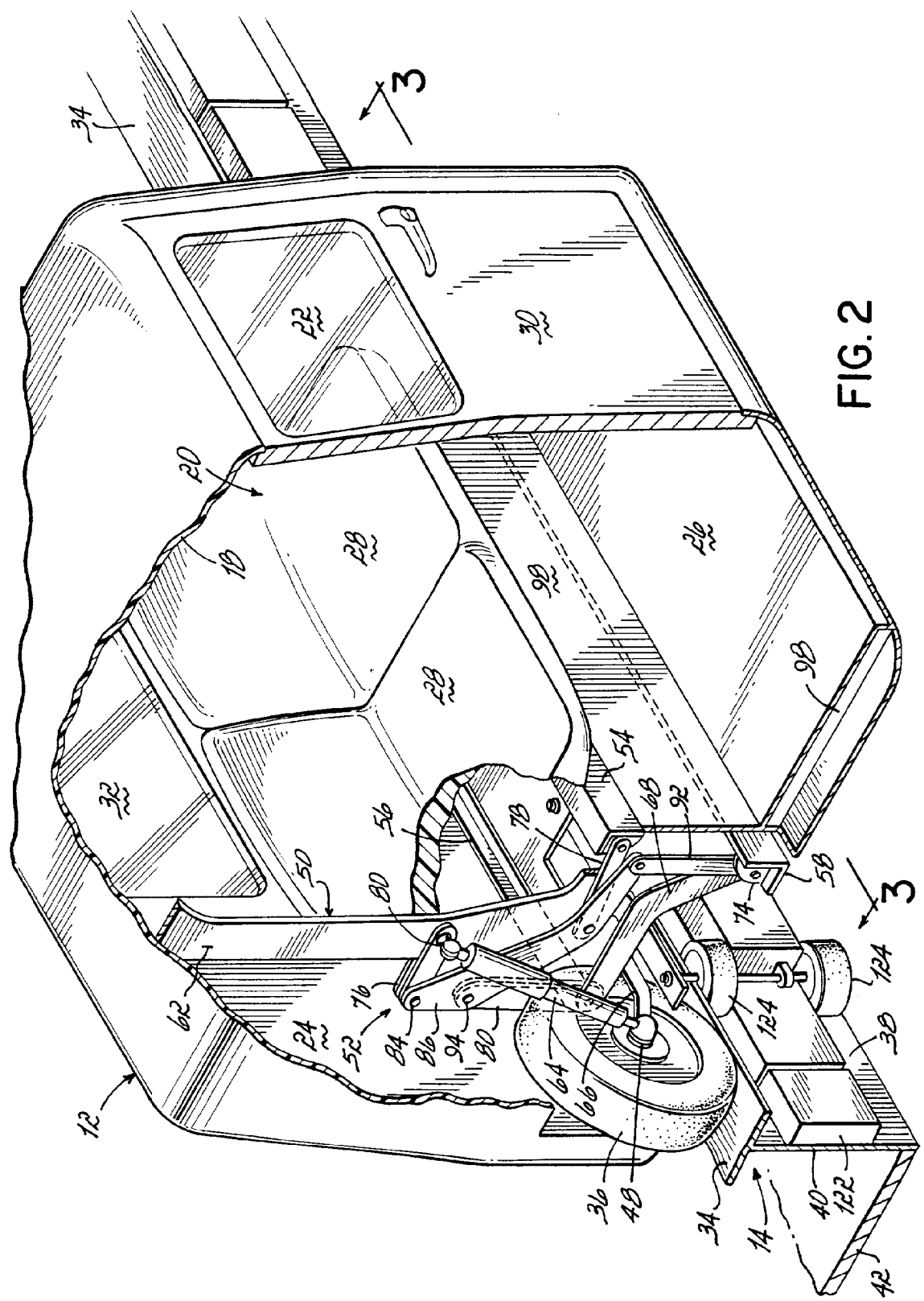
FIG. 2 is a perspective view of the end vehicle of the train of FIG. 1 with a portion of the vehicle broken away showing the guideway, running wheel and associated forward suspension system.

Referring to FIG. 1, a present embodiment of a monorail transportation system 10 is shown in which a transportation vehicle 12 for passengers, cargo or the like is positioned for travel on a guideway 14 of a monorail system 10. The vehicle 12, according to this invention, may operate separately or in conjunction with one or more serially connected vehicles 12, as shown in FIG. 1, to form a train 16 of vehicles 12. Each vehicle 12 includes a vehicle body 18 containing a passenger compartment 20, a plurality of windows 22, a back wall 24, a floor 26, seats 28 and a door 30 for access to/from the vehicle 12 (FIG. 2). The vehicle body 18 includes a window 32 opposite the door 30 which can be provided for emergency removal and access to or from the vehicle 12 as is required.

The monorail system 10 in a present embodiment includes a pair of spaced generally parallel guideways 14 having a number of rolling surfaces upon which the vehicles 12 travel. Each guideway 14 has a generally T-shaped configuration in which a top surface of the upper cross member of the T-shape provides a running surface 34 for a running wheel 36 of the vehicle 12. A stem of the T-shaped guideway 14 provides a pair of opposing guideway surfaces 38, 40 on opposite faces of the stem. A substantially identical second guideway 14 is spaced from the first guideway and is joined thereto by a horizontal grating 42 proximate the base of each guideway 14. For additional support, cross-bridging 44 is provided between the parallel guideways 14. As will be readily appreciated by one of ordinary skill in the art, a first guideway is useful for travel of the vehicles in a first direction and the second guideway is used for travel of the vehicle in a second, opposite direction.

Referring to FIGS. 2–5B, each vehicle 12 is equipped with the forward and an aft running wheel 36 mounted around an axle 48 for rotation on the running surface 34 of the guideway 14. Each running wheel 36 is coupled to a vehicle support frame 50 through an associated suspension linkage or suspension system 52. The forward and aft suspension systems 52 are coupled together by longitudinally extending upper, intermediate and lower spars 54, 56, 58. The upper spar 54 is fixed to the vehicle's support frame 50 and extends beneath and supports the pair of passenger seats 28, 28 which are oriented perpendicularly to the direction of travel of the vehicle 12 and the longitudinal axis of the guideway 14 for side mounted riding of a passenger 60 (FIG. 4) seated in the seats 28. Additional passenger seats and/or space for a wheel chair bound passenger may be included in the vehicle 12 and oriented parallel to the guideway 14.

Figure 3:
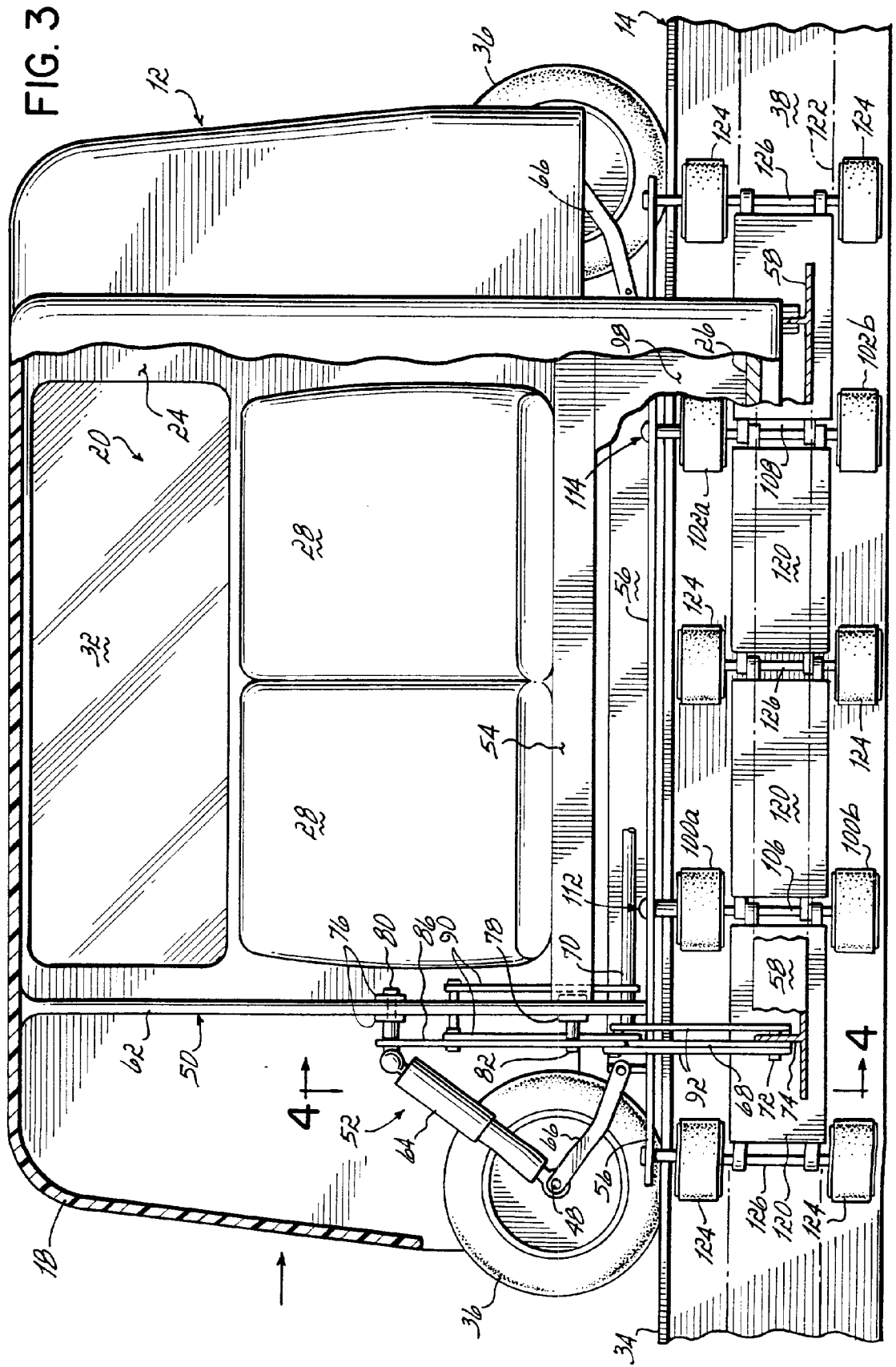
FIG. 3 is a cross-sectional side elevational view taken along line 3—3 of FIG. 2.

The vehicle body 18 is supported substantially from the support frame 50 including forward and aft vertical support posts 62 located longitudinally between the two running wheels 36 (FIG. 3). The running wheels 36 are coupled to the support posts 62 from their bearings by a spring/damper 64 at the front and rear of the vehicle 12. A toggle link 66 is mounted from the axle 48 of the running wheel 36 to the intermediate spar 56 as shown in FIG. 3.

The relationship between the running wheels 36, the support posts 62 and the vehicle 12 favors the placement of the center of gravity CG of the total occupied vehicle load longitudinally between the two vertical support posts 62 and generally above the upper guideway running surface 34. The two passenger seats 28, 28 or other load carrying horizontal surfaces are mounted at seat height between the vertical posts 62. The vehicle floor 26, door 30, body 18 and all other sprung loads are mounted from the support posts 62 or the upper spar 54 between them connecting them together below the seats 28, 28.

Referring particularly to FIGS. 2, 4, 5A and 5B, each of the suspension systems are mirror images of one another coupled to the forward and aft running wheels 36 and the forward and aft support posts 62. Specifically, each suspension system 52 includes a generally L-shaped arm 68 pivotally coupled by a pin 70 at a first end to the intermediate spar 56 and pivotally coupled by a pin 72 at a second end to the lower spar 58. As will be described later herein, the arm 68 controls the roll of the vehicle 12 relative to the guideway 14. A block 74 or other connecting structure is advantageously provided on each of the intermediate and lower spars 56, 58 for mounting the pin 70, 72 and associated linkages. The suspension system 52 also includes an upper shackle 76 and a lower shackle 78 in which a first end of the upper shackle 76 is pivotally coupled by a pin 80 to the support post 62 and a first end of the lower shackle 78 is pivotally coupled by a pin 82 to the upper spar 54 extending longitudinally under the seats 28, 28. The shackles 76, 78, each of which are pivotally coupled to the support frame 50 of the vehicle 12 via the post 62 and the upper spar 54, cooperate to control the lift of the vehicle 12 relative to the guideway 14. A second end of the upper shackle 76 is pivotally coupled by a pin 84 to an upper end of a dog leg-shaped main arm 86. A second end of the lower shackle 78 is pivotally coupled by a pin 88 to an intermediate position on the main arm 86.

The suspension system 52 further includes an upper link 90 and a lower link 92. A first end of the upper link 90 is pivotally coupled by a pin 94 to an upper portion of the main arm 86 and a first end of the lower link 92 is pivotally coupled by a pin 96 to a lower end of the main arm 86. A second end of the upper link 90 is pivotally coupled with the pin 70 to the intermediate spar 56 and, therefore, the first end of the arm 68. A second end of the lower link 92 is pivotally coupled by the pin 72 to the lower end of the arm 68 and, therefore, the lower spar 58. The links 90, 92 cooperate to control slip of the vehicle 12 relative to the guideway 14. The floor 26 of the vehicle 12 and associated reinforced bar 98 is connected to the upper spar 54 and structural frame 50 of the vehicle 12.

Figure 5A:
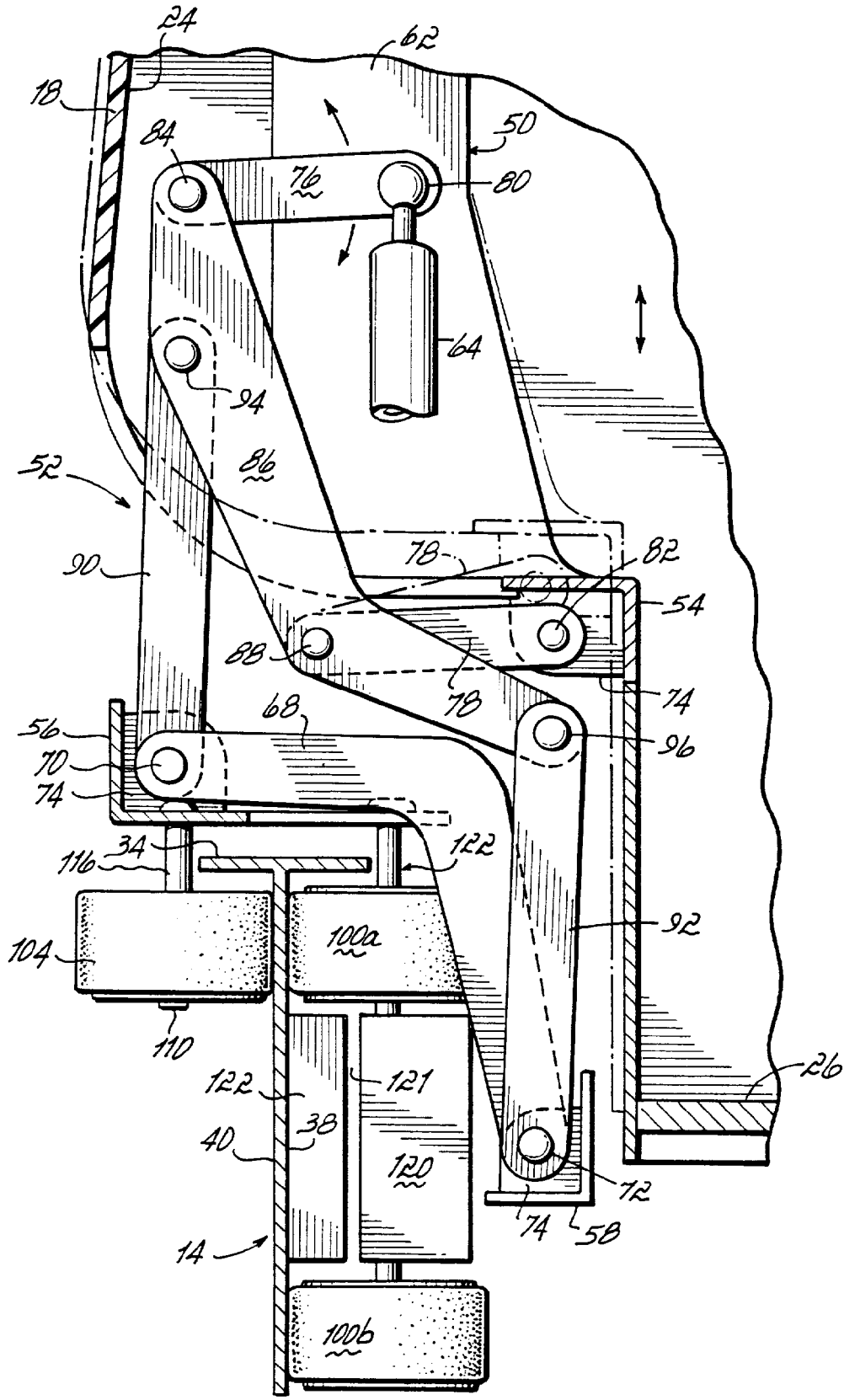
FIGS. 5A and 5B are similar enlarged views of the suspension system and guideway according to a present embodiment of this invention reacting to slip, roll and lift forces on the vehicle.
Figure 5B:
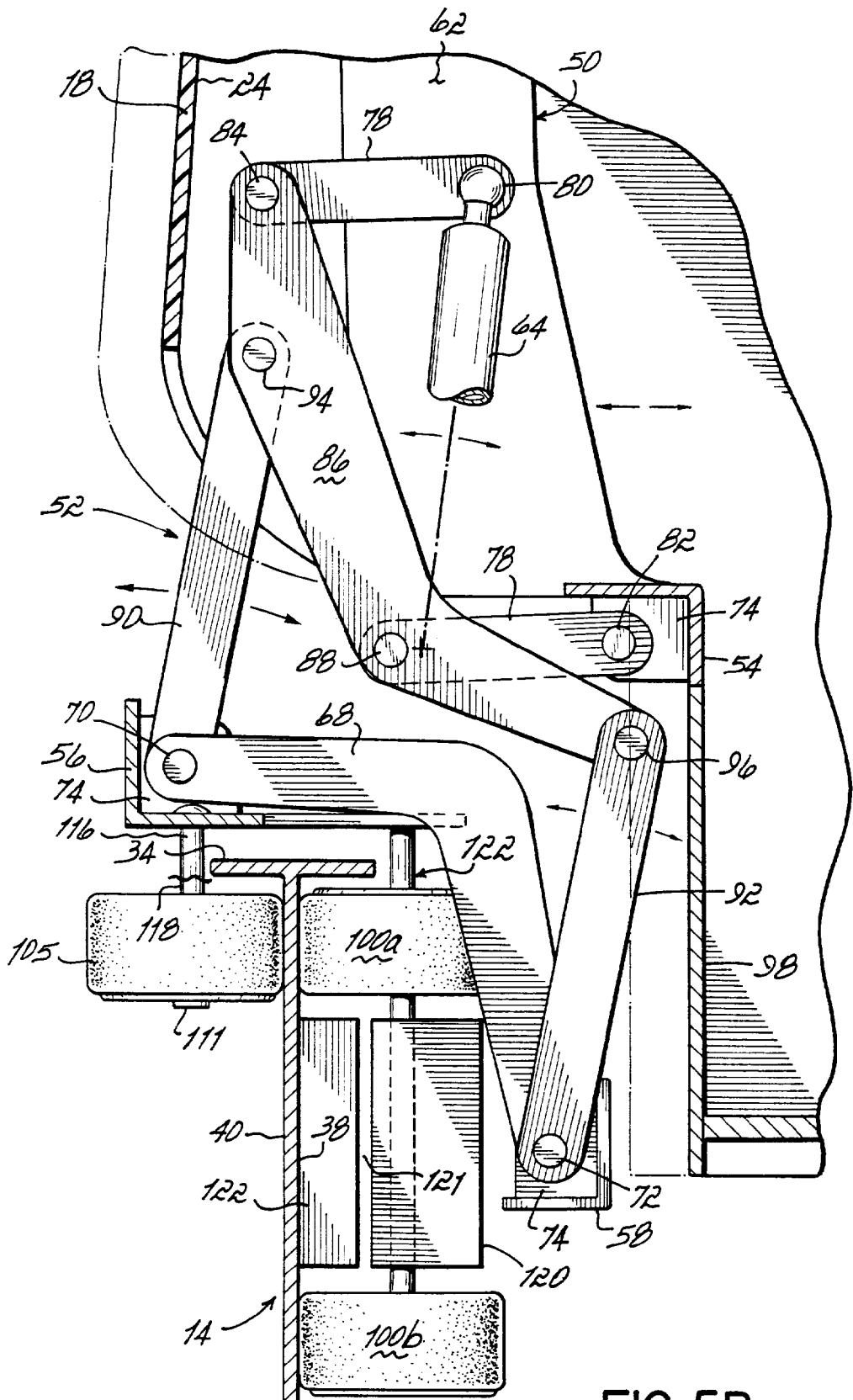

An additional part of the suspension system 52 for the vehicle 12 is a plurality of guide wheels 100a, 100b, 102a, 102b, 104, and 105 which are mounted on axles 106, 108, 110, 111 generally perpendicular to the axles 48 of the running wheels 36. The guide wheels 100 are mounted for rotation upon the side guideway surfaces 38, 40 of the stem of the T-shaped guideway 14 as shown particularly in FIGS. 3, 5A and 5B. Aft upper and lower guide wheels 100a, 100b are connected via an aft bogie 112 to the intermediate spar 56. Similarly, forward upper and lower guide wheels 102a, 102b are coupled to the intermediate spar 56 via a forward bogie 114. An additional forward upper guide wheel 104 is mounted on a bogie 116 to the intermediate spar 56 and, likewise, an additional upper aft guide wheel 105 is mounted via a bogie 118 to the intermediate spar 56 (FIG. 5B). The axles 106, 108, 110, 111 of the guide wheels 100a, 100b, 102a, 102b, 104, 105 are coupled to the intermediate spar 56 and the arm 68 through the pin 70 to control roll of the vehicle 12 relative to the guideway 14.

Figure 4:
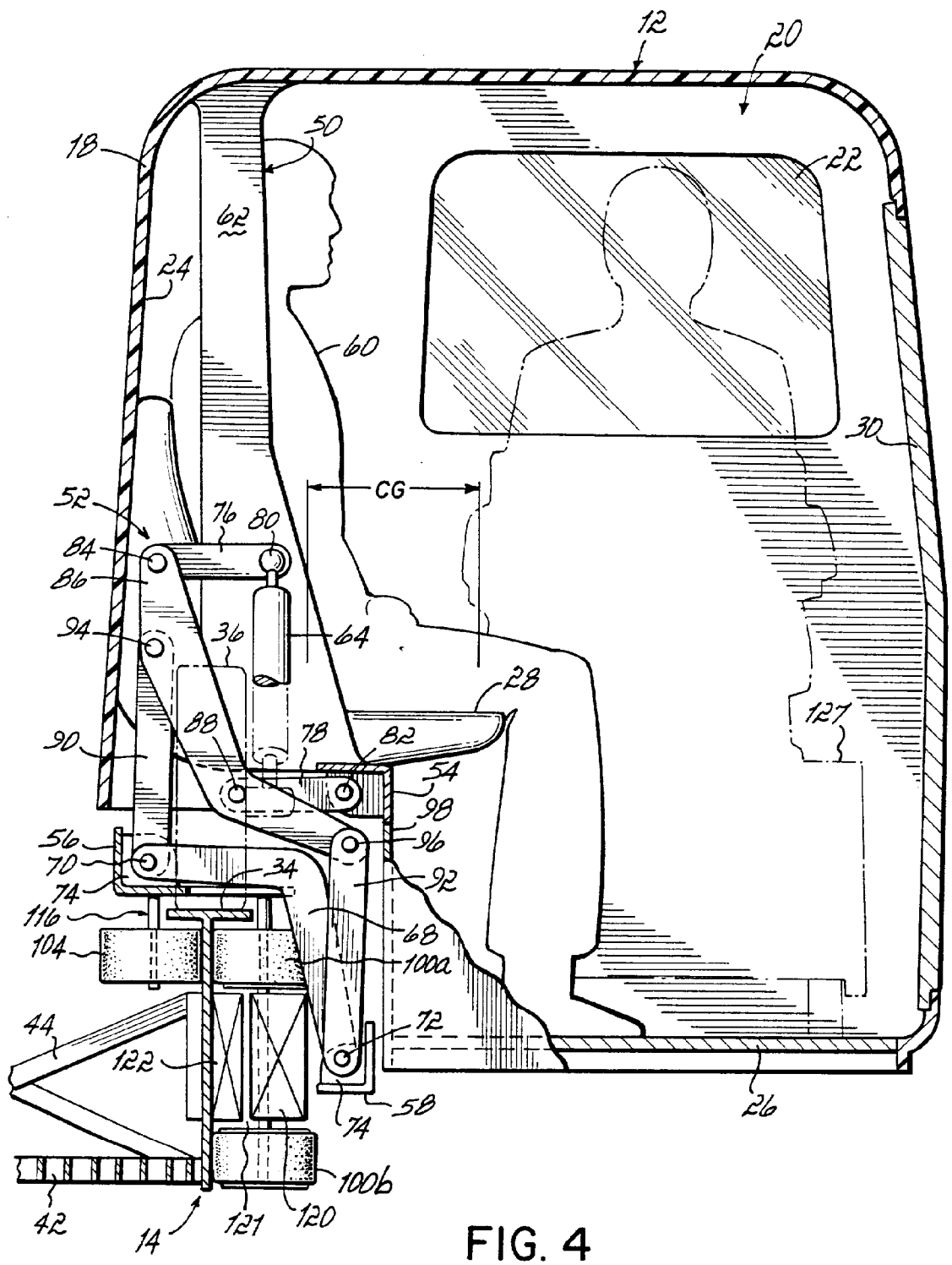
FIG. 4 is a cross-sectional view of the vehicle, suspension system and guideway taken along line 4—4 of FIG. 3.

As shown particularly in FIGS. 3 and 4, the vehicle 12 is propelled in a present embodiment by a linear drive motor 120 mounted beneath the undercarriage of the vehicle 12. The linear drive motor 120 operates in cooperation with a linear armature 122 mounted upon the side surface 38 of the guideway 14 as shown in FIG. 4. The linear drive motor 120 is maintained a specified distance 121 from the linear armature 122 by idler wheels 124 mounted on an axle 126 and coupled to the linear drive motor 120. The idler wheels 124 rotate along the guideway surface 38 of the guideway 14 thereby maintaining a constant separation between the linear drive motor 120 and the linear armature 122.

Generally, the center of gravity CG of the occupied or unoccupied vehicle 12 remains above the running surface 34 of the guideway 14 thereby permitting very light vehicles 12 and "deadheading" of empty vehicles 12 without a substantial penalty and expenditure of energy to the linear drive motor 120. The centrifugal forces result from curved travel on the guideway 14 or eccentric loading from passenger shifting, uneven passenger seating, wheelchairs 127 or other loads centered outwardly over the vehicle floor 26 which would put instantaneous and substantial eccentric loading on the running wheels 36. Because the top running surface 34 of the guideway 14 provides little or no lateral restraint on the running wheel 36, as is designed in the current invention, the entire sprung load of the vehicle 12 must be restrained from overturning by the guide wheels 100a, 100b, 102a, 102b, 104, 105 below to provide quiet operation and minimal vibration transmission.

As previously described, the two vertical support posts 62 are linked to the undercarriage by substantially identical, mirror image, suspension system linkages 52 fore and aft of the vehicle. Each of the two suspension system linkages 52 takes its load from the two shackles 76, 78 on each post 62, the upper shackle 76 in each system being loaded in tension outboard from an overturning force and the lower shackle 78 bearing in compression. The upper and lower shackles 76, 78 can rotate freely around the respective pivot pins connecting them to the vertical support posts 62 and do so generally parallel to one another to allow the vehicle 12 to move up and down and lift on the dampers 64 (FIG. 5A). The upper and lower shackles 76, 78 are linked by means of the heavy dog legged-shaped main arm 86 which, due to the pantographic arrangement of the upper and lower lift shackles 76, 78, is held in substantially the same angular orientation as the vehicle 12 and permits neither lateral rotation nor significant forward or aft thrusts of the vehicle body 18 independent of the suspension system linkages 52.

The vehicle 12 and associated suspension linkages 52 are propelled in the present embodiment by means of several, four of which are shown, linear motor stator magnets 120 positioned on the undercarriage of the vehicle 12 and opposite the substantially continuous linear motor armature 122 on the guideway 14. Each pair of stator magnets 120 is centered longitudinally, held at a constant distance away from the guideway 14 on the aft and forward bogies 112, 114. As previously described, the bogies 112, 114 are coupled to the upper spar 54 which holds the guide wheels 100a, 100b, 102a, 102b, 104, 105 at a constant longitudinal separation. If the guideway 14 and linear motor armature 122 curve, the stator magnets 120 pivot in response around the bogies 112, 114 to match the curve of the guideway 14. Positioned between the two magnets 120 are the idler wheels 124 which maintain the air gap 121 (FIG. 4) between the linear stator magnets 120 and the armature 122. When the vehicle 12 is assembled as part of a train 16, the forward end of the forward stator magnet 120 is hooked to the aft idler wheel 124 of the rearmost magnet 120 of the preceding vehicle 12 thereby allowing a continuous row of stator magnets 120 with the constant air gap 121 along the length of the train 16 and precluding the possibility of the forward end of any individual stator magnet 120 straying from its correct alignment or specified spacing 121 with respect to the armature 122.

The forward and aft main arms 86 on each vehicle 12 are linked to the remainder of the undercarriage assembly and the bogies by means of the upper and lower links 90, 92. The upper and lower links 90, 92 allow lateral displacement and, ultimately, allow some vehicle rotation around a longitudinal axis. Because the rear wall 24 of the vehicle 12 must be capable of being dislodged or popped out in an emergency, the present invention does not have a longitudinal chassis element crossing the rear window 32 escape route. Therefore, connections between the front and rear bogie all occur at or below the seat level.

The intermediate spar 56 connects together the two upper guide wheels 100a, 102a which suspend the entire suspension 52, normally in tension, from the upper guideway surface 38 of the guideway 14. The lower link 92 pivots to the lower spar 58 located substantially at the floor level 26 of the vehicle 12. Unlike the upper vehicle spar 54, the lower spar 58 and connecting link 92 is not fixed to the bogie bearings but instead springs or rocks around a radius centered on the intermediate spar 56. Under eccentric vehicle loading conditions, this lower spar 58 will be pressed against the lower guide wheels 100b, 102b. Thus, the upper and lower links 90, 92 at each end of the vehicle 12 rotate parallel to one another to allow pantographic lateral movement of the main arms 86 roughly parallel to the vehicle floor 26, but the entire vehicle 12 and undercarriage assembly rotates slightly relative to the guideway 14 to control transmission of rotational vibration. Rotational, vertical and lateral springing is dampered at each upper link 90 and lower arm 68 at the pivot connection with the upper spar 54.

Because the torsional loading is unpredictable and changing, the guideway 14 must be constructed to resist both longitudinal bending moment and lateral torque. The cross bridging 44 between two guideways 14, allowing trains 16 of vehicles 12 to pass in both directions on the same supporting structure, provides high moment of inertia and torsional stiffness for the entire guideway 14 assembly in the present embodiment, but can be adapted for mounting one-way, above ground, in tunnels, or on a steeper grade. Above grade the compression forces between two opposing guideways 14 can be resisted by the horizontal grating 42 between the bottoms of the two guideways 14 which doubles as a walking surface for emergency evacuation to the nearest ground support.

The integral structure of the guideway 14 allows short spans, straight or curved, with auxiliary structure needed only to control torsional displacement at the top 34 of the guideway 14 or to permit longer spans. Twisting is resisted by means of moment connections to the support structures at each end of each span, but the support structure and other intermediate structure is not limited by the technology of the vehicle 12 and guideway 14. Because the guideway 14 and suspension system 52 lie primarily within the envelope of the cross section of the vehicle 12, a minimal right-of-way is needed for passage in restricted areas with on-grade mounting. At the same time, and with the same basic light guideway structure, any additional trusses or stay cables may be added between or around the guideway pairs to allow for long spans.

The front vehicle 12 requires additional guidance electronics to handle tracking and vehicle control for the train 16 as a whole. This configuration concentrates guidance and safety checking at the front of the train 16 and keeps the remainder of the undercarriage for the length of the train 16 safe and under control by purely passive, geometrical alignment, reducing the possible sources of tracking errors to one location at the front of the train 16. With an equal drive motor 120 cross section provided along with each additional vehicle 12 in the train 16, the load to be dragged is always matched with the motor power available (given that the armature in the guideway 14 is also continuous and powered for its entire length). As a result, trains 16 of (theoretically) any length can be assembled to handle peak-hour passenger loading, or the lead vehicle 12 can be run by itself in the low-traffic hours, without active accommodation required by the electronic controls. Unlike canonical single-vehicle Personal Rapid Transit, several passengers in connected vehicles 12 can share a destination without the guidance system being required to track them individually and maintain short headways. Instead, a moderate (for example 20-second) headway can be maintained between trains 16, the trains 16 can be lengthened for higher passenger load periods, and the efficient matching of trains 16 full of passengers 60 to their shared destinations can be accomplished by using several guideways 14 side-by-side and skipping selected stops on each.

IMPLEMENTATION

Since the vehicle is entered from the side, no specific platform or station configuration or spacing is required and, except for full compliance with the ADA in the lead vehicle in each train, the platform need not be perfectly (within ½") level with the vehicle floor. Short boarding times suggest close station spacing; in a multi-route system requiring transfers, the intermediate mileage along each route would benefit from more widely spaced stops, so that the inefficiency of frequent acceleration and deceleration is confined to a limited number of shared destinations. No minimum or maximum speed is predicted; these will be determined in tests of rider comfort, possibly with commercially-available dampers and springs.

Most guideways will be grade-separated (typically elevated on concrete piers spaced a minimum of four vehicle lengths apart). Some segments of a route, especially those occupying existing railway rights-of-way, could be build on-grade or very close to grade, if surrounded completely by fences or berms. The torsion-resisting guideway construction would be similar to that for elevated routes, anchored at minimum 4' spacing (two-thirds vehicle length). It is preferable to provide enough elevation to discourage animals crossing over the top of the guideway.

Vertical pier supports are braced against rotation around the longitudinal axis (to resist periodic sideslip forces on the guideway) but need not be connected by grade beam or other longitudinal resistance against thrust or drag. Guideway spans of over two vehicle lengths will need to be stiffened against torsion as described above.

Additional structure of any length or depth can be used for longer spans, with the horizontal emergency-exit walkway grating resisting lateral movement over and above the twisting and deflection resisted by the span structure. This additional span structure can be provided by means of reinforced or post-tensioned concrete beams, steel or polymer composite tube members taking tension forces along the bottom member of a truss, suspension cables or cable stays from towers at either end of the span or arches.

The two upper guideway surfaces can themselves be the sides of a metal or polymer composite tube acting both as the top compression member for a truss and the source of resistance to torsion for spans of less than two vehicle lengths. Similarly, the lower rolling surface can act as the bottom, tension member of a truss, and the motor armature can be mounted (and removed for maintenance) between the vertical truss members.

When a long-span structure is required, as at bridges, the entire cross section of the stiffened two-way guideway structure (which resembles a wide-flange beam, just over two feet deep, lying on its side) can serve as the compression member of a more complex total structure. Below the double guideway, and welded (steel) or fused (polymer) to the inside of the lower rolling surface, would be vertical truss members spaced, at maximum, the two-vehicle-length distance required to resist torsion. These truss members would connect to a lower, tension member. This entire structure would then span between uprights or anchors for a suspended or cable-stayed very-long-span structure. Because the running surfaces double as the compression member of the spanning structure, significant additional dead weight is saved.

In either the medium-span or long-span configuration, the motor armature is mounted proximate the guideway surfaces, immediately adjacent to the connecting walkway grating. No forces except vehicle thrust are transmitted to the motor; all spanning and twisting forces are taken by the surrounding guideway structure. Because the motor and controls can be disassembled from the truss, repairs to the powered and signaled components of the guideway can be performed off-site without compromising the guideway structure.

The ends of each guideway span segment (just over or under two or four vehicle lengths),are separated by very small expansion joints. Because the spacing of these joints is just less than or greater than the length of the two-vehicle or four-vehicle pattern of the guide wheels that pass over them, each vehicle's resulting rotational "click" as it passes over the slightly separated ends of adjacent rolling surfaces will occur at a slightly different time for each vehicle in the train. In this way, a "wave" or "hum" will result at high speeds, with the rotational force distributed progressively along the train. This is much more acceptable for passenger comfort than would be a "click" of all the vehicles in the train simultaneously.

Each of the arms in each end of a vehicle suspension linkage are different in length (sharing no common-denominator lengths), to minimize periodic vibrations transferred from regularly-spaced deflections of the guideway. The rotational force in this suspension is sprung but not dampered. The force will be transferred to the upper shackle and converted from rotation to slip, which is dampered, before it reverberates back to the upper spar. Having an upper slip-resisting arm with a totally different period from that of the rolling radius against the lower spring absorbs regular rolling vibrations before they start to reinforce themselves periodically.

The guideway material itself is selected for its resistance to deflection, both to prevent periodic vertical vehicle bouncing spaced between the centers of spans, and to minimize twisting vibrations. Consistent with the effort to minimize the environmental impact of the guideway, wheel and rolling surface materials should be selected for quiet operation. Traction is not important, as emergency braking can engage directly against the rolling surface rather than through the wheels.

Three levels of braking should be included with the control and guidance systems; namely, (1) scheduled braking, (2) block following, and (3) emergency friction braking.

(1) Scheduled braking for normal station stops is performed entirely by means of regenerative magnetic braking through the linear motor and planned for at the beginning of the journey, based on passenger's requests for destinations which are received by a central "scheduling" system prior to their boarding the vehicle.

(2) The "block following" vehicle control system cuts off power to a specific number of guideway segments immediately behind the last vehicle in a train. A following train which encounters a "dead" block will automatically start to slow before it approaches too close to the rear of the preceding train. Continued "dead" operation will very briefly and lightly engage the friction brake described next, releasing it as soon as power is permitted to return to the track segment. Block-following braking should not be felt by passengers.

(3) Emergency friction braking is actuated against the rolling surface. Under normal conditions, the friction brake is held away from the rolling surface against a light springing load, to be engaged in case of total power failure in the guideway or guideway segment. In addition, the lead vehicle will carry collision detection which can signal the vehicles to actively engage the brakes with on-board power, proportionally to the proximity of the obstruction and speed of the train.

Local stops for the vehicles or trains are spaced roughly twenty seconds apart, and the typical upper limit of station dwell time is also twenty seconds due to the fast, individualized passenger loading possible with this suspension. Therefore, the ideal headway between trains is twenty seconds, with all vehicles starting from their stations at the same time for peak efficiency. While this will obviously happen seldom in practice, the control system for a guideway loop consisting of local stops might easily pre-process the train spacing in this area before transmitting the trains' destination and speed data to the control scheduler. In this way, centralized scheduling failures will affect only those segments of the system that cannot accommodate local scheduling, to minimize system-wide stops.

Passenger registration is performed differently from that of known mass transit. The ticket sales occur at the point on the platform where the passenger will board, the passenger being told where to stand along the platform, in order to be standing at a vehicle with a vacant or to-be-vacated seat. Parties of passengers can request boarding on same or adjacent vehicles, and for security and comfort, an entire vehicle can be reserved. The work of the central "scheduling" system is limited to billing, communication and overall train coordination, with the train spacing and stopping handled by "local" vehicle control systems.

For passenger comfort and energy conservation, door opening is restricted only to those vehicles in the train which have been "scheduled" to pick up or discharge a passenger or passengers. The door opener should minimize on-board moving parts by putting door controls into the guideway point opposite each platform loading position. In this way, the vehicle brake is engaged in combination with the door opener to hold an open vehicle securely to its loading position and to achieve some weight savings in moving parts.

Heating and air conditioning are piped from the front vehicle back through the train, with each vehicle's battery having only to operate a small reheat coil at the outlet diffuser. This will add another weight penalty to the lead vehicle in comparison to the other vehicles, but is preferable to having a net gain in drive energy for each vehicle added to the train, rather than a net loss. This results in some loss of energy efficiency in nighttime operations, when only the lead vehicle or very short trains are running.

Energy savings are further maximized by minimizing structural weight located perpendicularly away from the bogies. Therefore, the seat bottom, vehicle support frame, and inner portion of the vehicle floor are built relatively heavy for comfort and resistance to cantilevering forces. But the top and boarding (platform) side of the vehicle remains very light. A vehicle might be "all door" on its boarding side, with fixed vehicle height structure only at the front and back, and all wall and ceiling surfaces made of polymer composites.

The door and a possible small ramp to accommodate irregular platform height, should be clamped passively in place everywhere along the guideway except at loading positions where the vehicle stops at a platform. This will concentrate door-opening mechanism weight in the active, track portion of the opener and minimize vehicle weight, while completely eliminating the danger of in-transit opening. All non-load-position egress is through the emergency door above the guideway.

Only the linear motor elements and suspension system components and need to be made of heavy or hard-to-maintain materials. The remainder of the guideway, while performing substantial structural work whatever the span of any guideway segment, does not need to be provided anything except adequate torsion-resisting cross section, resistance to weather (an ideal application for composite polymers), and flat and quiet rolling surfaces. A brush (not shown) on the lead vehicle would serve to clear the track of snow and small obstructions.

Electricity on board the vehicle is only for emergency braking, caching of power to smooth out irregularities in the guideway power supply, slow emergency propulsion in case of guideway failure midway along bridges and tunnels, and lighting, reheat coils, and passenger communications.

Switching will occur only for removal of vehicles from the guideway for maintenance and will be done by sliding a guideway segment laterally. The guideway cross section is intended to provide potential for future development of line-speed switching.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broadest aspects is therefore not limited to the specific details and representative and illustrated example shown and described. Accordingly, departures may be made from the details described herein without departing from the spirit and scope of applicants' general inventive concept.

What is claimed is:

1. A suspension system for a vehicle operable on a stationary monorail guideway, the suspension system comprising:

a vehicle support frame including a post;

a running wheel mounted around an axle for rotation on an upper surface of the guideway;

a damper coupled at a first end to the post and at a second end to the axle of the running wheel;

an upper and a lower shackle, a first end of each of the shackles being pivotally coupled to the support frame, the shackles cooperating to control lift of the vehicle relative to the guideway;

a main arm being pivotally coupled to a second end of each of the shackles;

an upper and a lower link, a first end of each of the links being pivotally coupled to the main arm, the links cooperating to control slip of the vehicle relative to the guideway; and an arm pivotally coupled to a second end of the lower link to control roll of the vehicle relative to the guideway.

2. The suspension system of claim 1 wherein the suspension system is located proximate a forward end of the vehicle and a second substantially identical suspension system is located proximate an aft end of the vehicle.

3. The suspension system of claim 2 further comprising:

an upper, a lower and an intermediate spar, the lower spar being pivotally coupled to the second end of each of the lower links and the arm, the intermediate spar being pivotally coupled to the second end of each of the upper links and the arm, the upper spar being pivotally coupled to the first end of each of the lower shackles.

4. The suspension system of claim 3 wherein each of the posts is fixed to the upper spar.

5. The suspension system of claim 1 further comprising:

at least one guide wheel mounted around a guide axle which is oriented generally perpendicular to the axle of the running wheel for rotation on a side surface of the guideway, the guide axle being coupled to the arm to control roll of the vehicle relative to the guideway.

6. The suspension system of claim 1 further comprising:

at least two guide wheels mounted around separate guide axles which are oriented generally perpendicular to the axle of the running wheel for rotation on opposite side surfaces of the guideway, the guide axles being coupled to the arm to control roll of the vehicle relative to the guideway.

7. A suspension system for a vehicle operable on a stationary monorail guideway, the suspension system comprising:

a vehicle support frame including an upper spar extending longitudinally on the vehicle;

a forward and an aft suspension linkage located proximate forward and aft ends of the vehicle, respectively;

a forward and an aft running wheel being mounted around a forward and an aft axle, respectively, for rotation on an upper surface of the guideway;

at least two guide wheels mounted around separate guide axles which are oriented generally perpendicular to the axles of the running wheels for rotation on opposite side surfaces of the guideway, the guide axles being coupled to the forward and aft suspension linkages to control roll of the vehicle relative to the guideway;

an intermediate and a lower spar each extending longitudinally on the vehicle and joining the suspension linkages, wherein each of the suspension linkages comprise:

(a) a post fixed to the upper spar;

(b) a damper coupled at a first end to the post and at a second end to the axle of the respective wheel;

(c) an arm pivotally coupled to the intermediate and the lower spars to control roll of the vehicle relative to the guideway;

(d) an upper and a lower shackle, a first end of the upper shackle being pivotally coupled to the post and a first end of the lower shackle being pivotally coupled to the upper spar, the shackles cooperating to control lift of the vehicle relative to the guideway;

(e) a main arm being pivotally coupled to a second end of each of the shackles; and (f) an upper and a lower link, a first end of each of the links being pivotally coupled to the main arm and a second end of each of the links being pivotally coupled to the arm, the links cooperating to control slip of the vehicle relative to the guideway.

8. The suspension system of claim 7 wherein the second end of each of the upper and of the lower links is pivotally coupled to the intermediate and lower spars, respectively.

9. A monorail transportation system comprising:

a fixed guideway having an upper running surface and a guide side surface;

a passenger vehicle mounted for movement along the guideway;

a motor for propulsion of the vehicle;

a suspension system coupling the vehicle to the guideway and controlling lift, slip and roll of the vehicle relative to the guideway, the suspension system comprising:

(a) a vehicle support frame including a post;

(b) a running wheel mounted for rotation on the guideway upper running surface;

(c) a damper coupled at a first end to the post and at a second end to the running wheel;

(d) an upper and a lower shackle, a first end of each of the shackles being pivotally coupled to the support frame, the shackles cooperating to control lift of the vehicle relative to the guideway;

(e) a main arm being pivotally coupled to a second end of each of the shackles;

(f) an upper and a lower link, a first end of each of the links being pivotally coupled to the main arm, the links cooperating to control slip of the vehicle relative to the guideway; and (g) an arm pivotally coupled to a second end of each of the links to control roll of the vehicle relative to the guideway.

10. The monorail transportation system of claim 9 wherein the motor further comprises:

a substantially continuous linear motor armature mounted on the guideway; and a linear drive motor on the vehicle, wherein the linear drive motor is maintained at substantially a constant distance from the linear motor armature during movement of the vehicle on the guideway.

11. The monorail transportation system of claim 10 further comprising:

at least one idler wheel mounted for rotation on the guide surface to maintain the constant distance between the linear drive motor and the linear motor armature.

12. The monorail transportation system of claim 9 further comprising:

at least one guide wheel mounted generally perpendicular to the running wheel for rotation on the guide surface of the guideway, the guide wheel being sprung to the arm to control roll of the vehicle relative to the guideway.

13. The monorail transportation system of claim 9 further comprising:

at least two guide wheels mounted around separate guide axles which are oriented generally perpendicular to the axles of the running wheels for rotation on opposite guide surfaces of the guideway, the guide axles being coupled to the arm to control roll of the vehicle relative to the guideway.

14. The monorail transportation system of claim 13 wherein a cross sectional configuration of the guideway is generally T-shaped with the running surface being atop an upper cross member of the T-shape and the guide surfaces being on opposite faces of a stem of the T-shape.

15. The monorail transportation system of claim 9 further comprising:

at least one passenger seat mounted to the vehicle support frame and oriented generally perpendicular to the guideway.

16. The monorail transportation system of claim 15 wherein the vehicle is side mounted on the guideway and a center of gravity of the vehicle is positioned outside of the guideway.

17. The monorail transportation system of claim 9 wherein the vehicle moves in first direction along the guideway, the system further comprising:
   a second guideway being spaced from and generally parallel to the guideway; and
   a second passenger vehicle substantially identical to the passenger vehicle and being mounted for movement along the second guideway in a second direction opposite to the first direction.

18. The monorail transportation system of claim 9 wherein the suspension system is located proximate a forward end of the vehicle and a second substantially identical suspension system is located proximate an aft end of the vehicle.

19. The monorail transportation system of claim 9 further comprising:
   a plurality of additional passenger vehicles being similar to the passenger vehicle, serially coupled to the passenger vehicle and mounted on the guideway.

20. A monorail transportation system comprising:
   a fixed guideway having an upper running surface and opposing guide surfaces;
   a passenger vehicle having a support frame and being side mounted for movement along the guideway;
   at least one passenger seat mounted to the vehicle support frame and oriented generally perpendicular to the guideway;
   a linear drive motor for propulsion of the vehicle;
   a suspension system coupling the vehicle to the guideway and controlling lift, slip and roll of the vehicle relative to the guideway, the suspension system comprising:
      (a) a vehicle support frame post;
      (b) a running wheel mounted for rotation on the guideway upper running surface;
      (c) a damper coupled at a first end to the post and at a second end to the running wheel;
      (d) an upper and a lower shackle, a first end of each of the shackles being pivotally coupled to the post, the shackles cooperating to control lift of the vehicle relative to the guideway;
      (e) a main arm being pivotally coupled to a second end of each of the shackles;
      (f) an upper and a lower link, a first end of each of the links being pivotally coupled to the main arm, the links cooperating to control slip of the vehicle relative to the guideway;
      (g) an arm pivotally coupled to a second end of each of the links to control roll of the vehicle relative to the guideway; and
      (h) a plurality of guide wheels mounted generally perpendicular to the running wheel for rotation on the opposing guide surfaces of the guideway, the guide wheels being coupled to the arm to control roll of the vehicle relative to the guideway.

21. The monorail transportation, system of claim 20 wherein a cross sectional configuration of the guideway is generally T-shaped with the running surface being atop an upper cross member of the T-shape and the guide surfaces being on opposite faces of a stem of the T-shape.

22. The monorail transportation system of claim 21 wherein a center of gravity of the vehicle is positioned outside of the guideway.

23. The monorail transportation system of claim 20 wherein the vehicle moves in first direction along the guideway, the system further comprising:
   a second guideway being spaced from and generally parallel to the guideway; and
   a second passenger vehicle substantially identical to the passenger vehicle and being mounted for movement along the second guideway in a second direction opposite to the first direction.

24. The monorail transportation system of claim 20 wherein the suspension system is located proximate a forward end of the vehicle and a second substantially identical suspension system is located proximate an aft end of the vehicle, the suspension systems being joined by a pair of spars extending longitudinally in the vehicle.

25. The monorail transportation system of claim 20 further comprising:
   a plurality of additional passenger vehicles being similar to the passenger vehicle, serially coupled to the passenger vehicle and mounted on the guideway.

* * * * *